United States Patent
Mitchell et al.

(10) Patent No.: US 7,580,167 B2
(45) Date of Patent: *Aug. 25, 2009

(54) DETERMINING WHETHER TO CONVERT IMAGE DATA IN AN INPUT COLOR SPACE TO AN OUTPUT COLOR SPACE IN A TRANSFORM DOMAIN OR REAL DOMAIN

(75) Inventors: Joan La Verne Mitchell, Longmont, CO (US); Yue Qiao, Longmont, CO (US); Nenad Rijavec, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 426 days.

This patent is subject to a terminal disclaimer.

(21) Appl. No.: 11/469,826

(22) Filed: Sep. 1, 2006

(65) Prior Publication Data
US 2008/0055615 A1    Mar. 6, 2008

(51) Int. Cl.
*G03F 3/08* (2006.01)
*G06K 9/36* (2006.01)
*G06K 9/46* (2006.01)
*H04N 1/60* (2006.01)
*G06F 3/12* (2006.01)

(52) U.S. Cl. .................... 358/518; 382/166; 382/244; 382/246; 382/250; 358/1.9; 358/1.15

(58) Field of Classification Search .............. None
See application file for complete search history.

(56) References Cited

U.S. PATENT DOCUMENTS

| | | | |
|---|---|---|---|
| 5,434,623 A | 7/1995 | Coleman et al. | |
| 5,533,173 A | * 7/1996 | Wober et al. | 358/1.15 |
| 6,671,414 B1 | * 12/2003 | Micchelli et al. | 382/250 |
| 6,678,423 B1 | 1/2004 | Trenary et al. | |
| 6,788,811 B1 | 9/2004 | Matsuura et al. | |

(Continued)

FOREIGN PATENT DOCUMENTS

| JP | 2000106631 A | 4/2000 |
|---|---|---|
| JP | 2002016943 A | 1/2002 |
| JP | 2002171534 A | 6/2002 |
| JP | 2002199225 A | 7/2002 |

OTHER PUBLICATIONS

Syed Ali Khayam The Discrete Ocsine Transform (DCT): Theory and Application Mar. 10, 2003.*

(Continued)

*Primary Examiner*—Twyler L Haskins
*Assistant Examiner*—Barbara D Reinier
(74) *Attorney, Agent, or Firm*—Blakely, Sokoloff, Taylor & Zafman LLP (57) ABSTRACT

Provided are a method, system, and article of manufacture for determining whether to convert image data in an input color space to an output color space in a transform domain or real domain. An input block of coefficients in an input color space is generated, wherein the input block includes a first type coefficient and a plurality of second type coefficients. The first type coefficient in the input block is converted to an output value in an output color space. A determination is made as to whether real domain processing is required. The input block is converted in a transform domain to an output block of coefficients in the transform domain in an output color space in response to determining that the output value does not require real domain processing.

16 Claims, 10 Drawing Sheets

U.S. PATENT DOCUMENTS

| | | |
|---|---|---|
| 6,940,523 B1 | 9/2005 | Evoy |
| 6,970,179 B1 | 11/2005 | Trenary et al. |
| 2003/0076979 A1 | 4/2003 | Matsui |

OTHER PUBLICATIONS

Warnock, et al., "A Device Independent Graphics Imaging Model for Use with Raster Devices", ACM, 1982, pp. 313-319.

Moss, et al., "Approaches to Adding Persistence to Java", 1st International Workshop on Persistence and Java, Drymen, Scotland, Sep. 1996, pp. 4-168.

Littlewood, et al., "Pareto-Optimal Formulations for Costs Versus Colorimetric Accuracy Trade-Offs in Printer Color Management", ACM Transactions on Graphics, vol. 21, No. 2, Apr. 2002, pp. 132-175.

U.S. Application entitled "Converting Image Data in an Input Color Space to an Output Color Space in a Transform Domain", Serial No. unknown; filing date Sep. 1, 2006, IBM, by inventors Y. Qiao; N.Rijavec and J.L. Mitchell.

* cited by examiner

DETERMINING WHETHER TO CONVERT IMAGE DATA IN AN INPUT COLOR SPACE TO AN OUTPUT COLOR SPACE IN A TRANSFORM DOMAIN OR REAL DOMAIN

BACKGROUND OF THE INVENTION

1. Field of the Invention

The present invention relates to a method, system, and article of manufacture for determining whether to convert image data in an input color space to an output color space in a transform domain or real domain.

2. Description of the Related Art

Colors received as input to render at an output device are mapped from one color space to a color space used by the device rendering the output color value. Color conversion is performed if the output device, e.g., video controller, printer, storage, etc. processes data to render in a different format than the input color value. For instance, a color in an RGB (Red, Green and Blue) color space may be mapped to a CMYK (Cyan, Magenta, Yellow and Black), and vice versa. Further, many printers only have black ink, so their output color space comprises halftone color values. If the input color value is in a CMYK color space, then the CMYK color must be converted to the halftone or black (K) color value for rendering by the "black and white" printer.

If the image data in the input color space to convert is compressed, such as by a Joint Photographic Experts Group (JPEG) compression technique, then blocks of the compressed image are first decompressed by entropy decoding and dequantizing the blocks to obtain decompressed blocks of Discrete Cosine Transform (DCT) coefficients in the transform domain. An inverse transform is then performed on these blocks of DCT coefficients in the transform domain to produce the image pixels in the real domain in the input color space. The pixels in the real domain are then converted using a color conversion lookup table or other technique to uncompressed image data in the real domain in the output color space. This converted image data in the output color space may then be transformed to the transform domain and compressed by performing a forward DCT transform on the image data, quantizing the resulting DC and AC values of the image blocks, and then entropy encoding the quantized blocks of image data to produce compressed image data in the output color space.

There is a need in the art to provide improved techniques to convert compressed image data in an input color space to image data in an output color space.

SUMMARY

Provided are a method, system, and article of manufacture for determining whether to convert image data in an input color space to an output color space in a transform domain or real domain. An input block of coefficients in an input color space is generated, wherein the input block includes a first type coefficient and a plurality of second type coefficients. The first type coefficient in the input block is converted to an output value in an output color space. A determination is made as to whether real domain processing is required. The input block is converted in a transform domain to an output block of coefficients in the transform domain in an output color space in response to determining that the output value does not require real domain processing.

DETAILED DESCRIPTION

Figure 1:
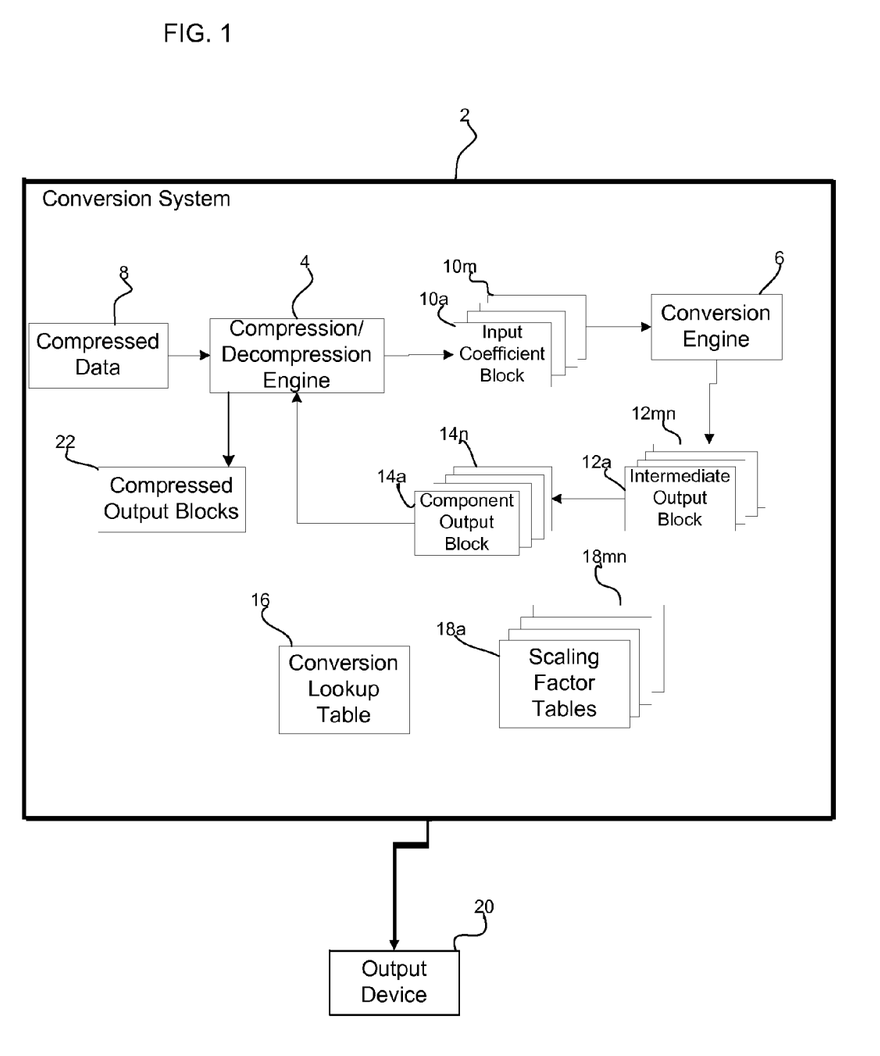
FIG. 1 illustrates an embodiment of a computing environment for color conversion.

FIG. 1 illustrates an embodiment of a computing environment including a conversion system 2 mapping values in an input color space, e.g., Cyan Magenta Yellow Black (CMYK), Red Green Blue (RGB), CIELAB, to a value in an output color space, e.g., K, CMYK, RGB, etc., while the values in the input color space remain in the transform domain. The conversion system 2 includes a compression/decompression engine 4 and a conversion engine 6. The compression/decompression engine 4 receives compressed data 6, comprising a portion of a compressed image. For instance, the compressed data 6 may comprise a portion of a JPEG image, such as one 8×8 block of image data in a transform domain. The compression/decompression engine 4 may include code to compress and decompress image data according to a suitable compression algorithm known in the art, such as the JPEG compression/decompression engine. The compression/decompression engine 4 may produce multiple input coefficient blocks 10a, 10b . . . . 10n, where each block corresponds to one of the n color components in the input color space in a transform domain. For instance, if the compression/decompression engine 4 implements the JPEG algorithm, than the input blocks 10a, 10b . . . 10n may comprise 8×8 blocks of Discrete Cosine Transform (DCT) coefficients in the transform domain, one for each color component in the input color space. For instance, for JPEG, there may be 64 DCT coefficients, one DC coefficient and 63 AC coefficients.

The conversion engine 6 receives the uncompressed input coefficient blocks 10*a*, 10*b* . . . 10*m* for the m component input color space and converts them to m*n intermediate output blocks 12*a*, 12*b* . . . 12*mn* (where "mn" is m times n) in the output color space having n color components. The conversion engine 6 may then convert the intermediate output blocks 12*a*, 12*b* . . . 12*mn* into n component output blocks 14*a*, 14*b* . . . 14*n* in the output color space. The conversion engine 6 may perform the color conversion while the input 10*a*, 10*b* . . . 10*m* and output 14*a*, 14*b* . . . 14*mn* coefficient blocks remain in the transform domain.

To perform the conversions, the conversion engine 6 uses a conversion lookup table 16 that provides a mapping of input values in the input color space to output values in the output color space. The lookup table 16 may include mappings for less than all the values in the input color space forming a mesh of values for each input color component that encompasses the range of all possible values for an input color component. If an input value did not match one of the values for the input color space in the lookup table 16, then the conversion engine 6 uses interpolation from values in the table 16 to determine the output value in the output color space for the input color value.

The conversion engine 6 further utilizes scaling factor tables 18*a*, 18*b* . . . . 18*mn*, where there is one scaling factor table for each of the m input color components and n output color components. The scaling factor table (i,j) provides a mapping of an output value in the output color space, having m color components, to a scaling factor to be applied to the AC coefficients in the input coefficient block i to produce an output coefficient block (i,j) for the color component i in the input color space and the color component j in the output color space. The mapping of output values in the output color space to scaling factors for each color component in the input and output color spaces may be determined from a function for a curve fit to sample data comprising the scaling factors applied to AC coefficients to produce output values in the output color space.

The conversion engine 6 processes the intermediate output blocks 12*a* . . . 12*mn* to produce m component blocks in the output color space that may be provided to output device 20. Further, the component output blocks 14*a* . . . 14*n* may be provided to the compression/decompression engine 4 to compress the component output blocks 14*a* . . . 14*n* to produce compressed output blocks 22, such as compressed JPEG data.

The conversion system 2 may be implemented in hardware logic, e.g., an Application Specific Integrated Circuit (ASIC), or in a computer comprising a processor executing code to access the lookup table 4 from a computer readable medium and perform the compression/decompression engine 4 and conversion engine 6 operations using the accessed lookup table 16 and scaling factor tables 18*a* . . . 18*mn*. The conversion system 2 may be part of printer hardware and the output device 12 may comprise the printer engine to render the color or halftone represented by the output value 20. Alternatively, the conversion system 2 may be part of a video controller and the output device 20 may comprise a display monitor to render the output value. Yet further, the output device 20 may comprise a storage device to store the output data for later use or processing. The output device 20 may comprise other suitable output devices known in the art, such as a network adaptor to transmit the output data.

Figure 2:
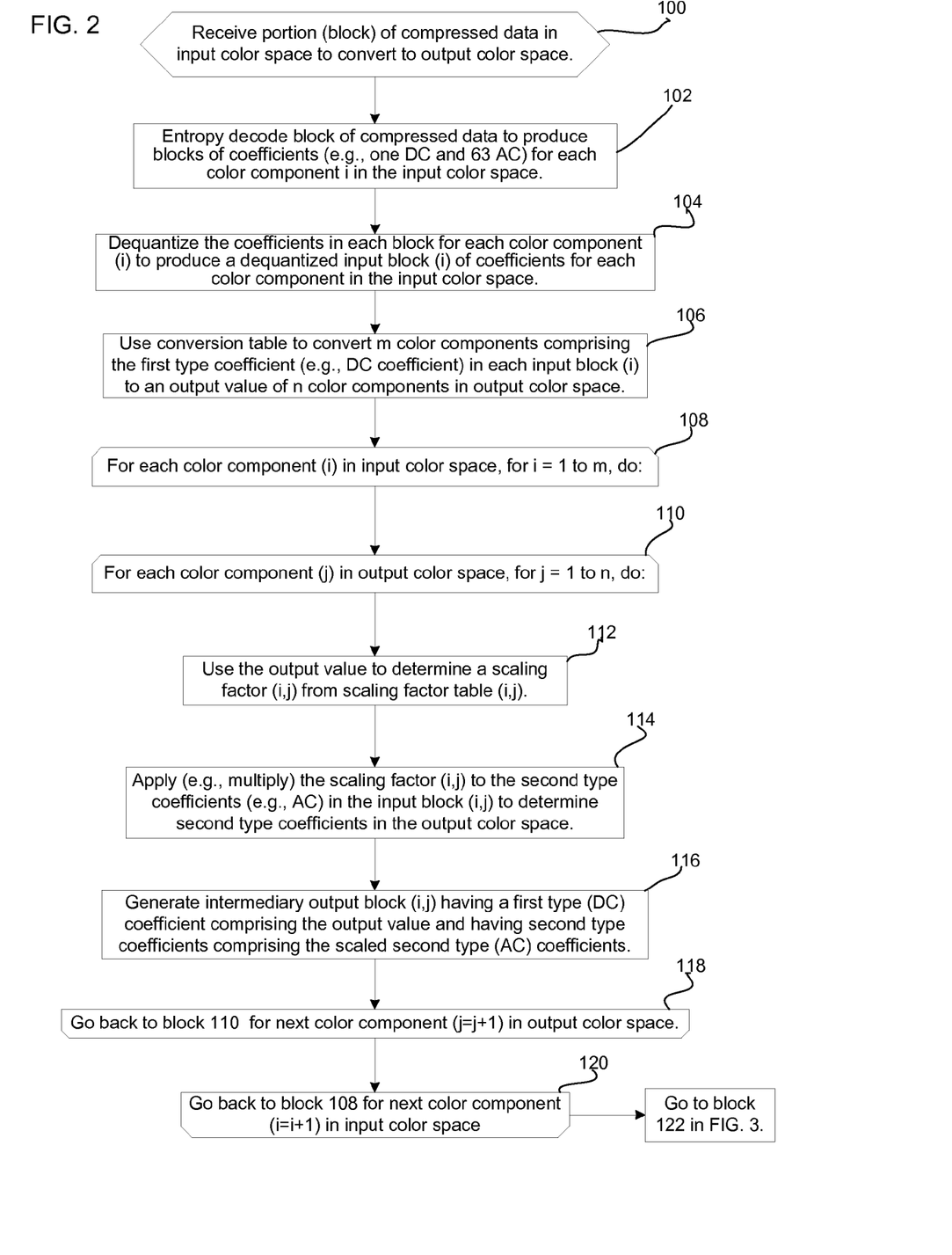
FIGS. 2 and 3 illustrate an embodiment of operations to convert image data in a transform domain in an input color space to image data in the transform domain in an output color space.
Figure 3:
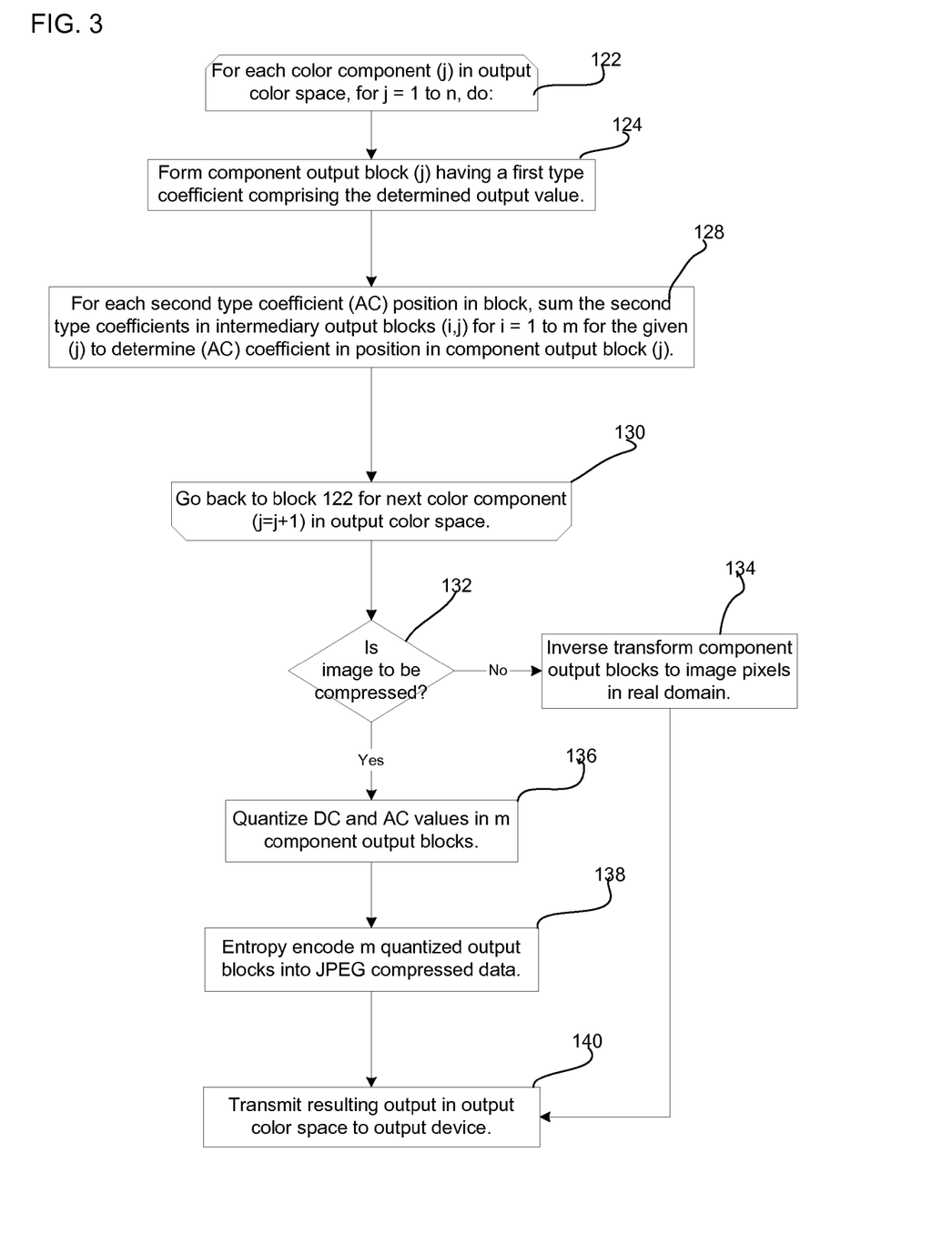

FIGS. 2 and 3 illustrate an embodiment of operations performed by the compression/decompression engine 4 and conversion engine 6 to convert a portion of compressed data 8 in an input color space to data in the an output color space while performing the conversion on data in the transform domain.

The compression/decompression engine 4 receives (at block 100) a portion (block) of compressed data 8 in an input color space having m color components to convert to an output color space having n color components. In one embodiment, m and n comprise integer values greater or equal to one, where the values may be the same or different. The compression/decompression engine 4 entropy decodes (at block 102) the received block to produce m blocks of coefficients (e.g., one DC and 63 AC), one block for each color component i in the input color space. The compression/decompression engine 4 may then dequantize (at block 104) the coefficients in each of the m blocks for each color component (i) to produce a dequantized input coefficient block (i) for each of the m color components in the input color space. As discussed, the input coefficient blocks 10*a* . . . 10*m* comprise uncompressed AC and DC coefficients in the transform (DCT) domain.

The conversion engine 6 receives the input coefficient blocks 10*a* . . . . 10*m* and uses (at block 106) the conversion lookup table 16 to convert an input value comprising the m first type coefficients (e.g., DC coefficient) in the input coefficient blocks 10*a*, 10*b* . . . 10*m* to an output value of m color components in output color space. In one embodiment, the first type or DC coefficient may be directly related to an output value or differ by a factor. In such case, either the DC coefficient or the values in the lookup table 16 may be adjusted to provide a mapping of the DC coefficients for the input color components to the corresponding output value in the output color space.

The conversion engine 6 then performs a loop of operations at blocks 108 through 118 for each color component (i) in the input color space for i=1 to m, where m is the number of color components in the input color space. For each color component i, the conversion engine 6 further performs a loop of operations at blocks 110 through 116 for each color component (j) in the output color space for j=1 to n, where n is the number of color components in the output color space. The conversion engine 6 uses (at block 112) the determined output value in the output color space to determine a scaling factor (i,j) from scaling factor table (i,j). The conversion engine 6 then applies (at block 114) the scaling factor (i,j) to the second type coefficients (e.g., AC) in the input coefficient block (i,j) to determine second type coefficients in the output color space for input color component i and output color component j. In one embodiment, the scaling factor may be applied by multiplying the scaling factor by each AC coefficient in the input coefficient block. In this way, the DC coefficient may be used to determine the scaling factor for the AC coefficients.

The conversion engine 6 then generates (at block 116) an intermediate output block (i,j) in the output color space having a first type (DC) coefficient comprising the output value and having second type coefficients comprising the scaled second type (AC) coefficients. In this way, one intermediate output coefficient block (i,j) in the output color space is generated for each of the m input color components and n output color components, providing m×n (m times n) intermediate output blocks 12*a* . . . 12*mn*. After generating all the intermediate output blocks 12*a* . . . 12*mn*, control proceeds to block 122 in FIG. 3.

The conversion engine 6 performs a loop of operations at blocks 122 through 130 for each color component (j) in the output color space to generate the component output blocks 14*a* . . . 14*n* in the output color space, one for each output space color component. A component output block (j) is formed (at block 124) having a first type coefficient (DC) comprising the determined output value, or some derivative thereof. The conversion engine 6 then sums, for each second type coefficient (AC) position in the output block (e.g., each of the 63 AC coefficients), the second type coefficients in intermediate output blocks (i,j) for i=1 to m for the given color component (j) to determine the second type coefficient (AC) for the position in component output block (j). In this way, the component output block (j) is generated by performing a sum operation of the AC coefficients in the intermediate output blocks (i,j) for i=1 to n and the given output color component j. The resulting component output blocks 14*a* . . . 14*n* comprise the blocks of data in the output color space in the transform domain, such as blocks of DCT coefficients.

If (at block 132) the resulting component output blocks 14*a* . . . 14*n* are not to be compressed, then the compression/decompression engine 4 performs an inverse transform (at block 134) on the component output blocks 14*a* . . . 14*n* to produce image pixels in the real domain. Otherwise, if the component output blocks 14*a* . . . 14*n* are to be compressed, then the compression/decompression engine 4 quantizes (at block 136) the DC and AC values in the n component output blocks 14*a* . . . 14*n* and entropy encodes (at block 138) the n quantized output blocks into compressed data, e.g., JPEG data, in the transform domain. The resulting data in the output color space in the transform or real domain is then transmitted (at block 138) to an output device 20 for further processing or storage.

Figure 4:
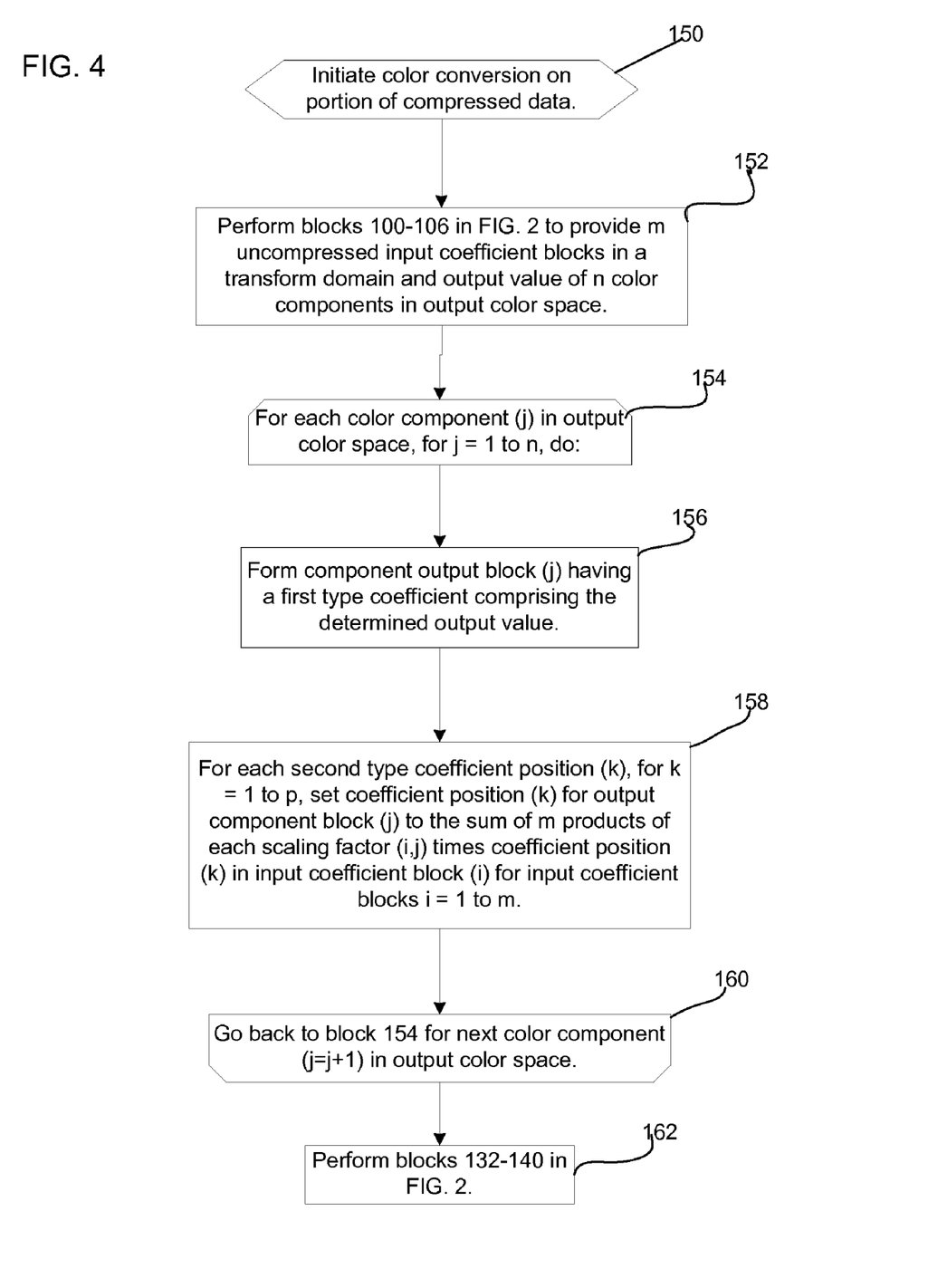
FIG. 4 illustrates an additional embodiment of operations to convert image data in a transform domain in an input color space to image data in the transform domain in an output color space.

FIG. 4 illustrates an alternative embodiment for generating the component output blocks 14*a* . . . . 14*n* from the input coefficient blocks 10*a* . . . 10*m* without generating the intermediate output blocks 12*a* . . . . 12*mn*. Upon initiating (at block 150) the color conversion process, the compression/decompression 4 and/or conversion 6 engine may perform (at block 152) the operations at blocks 100-106 in FIG. 2 to provide m uncompressed input coefficient blocks 10*a* . . . 10*m* of coefficients in a transform domain and an output value of n color components in the output color space. The conversion engine 6 performs a loop of operations at blocks 154 through 160 for each output color component (j) for j=1 . . . . n. At block 156, a component output block (j) is formed having a first type coefficient comprising the determined output value. The conversion engine 6 then performs an operation (at block 158) for each second type coefficient position (k), for k=1 to p, where "p" is the number of second type coefficients, e.g., 63 AC coefficients. The coefficient position (k) for output component block (j) is set (at block 158) to the sum of m products of each scaling factor (i,j) times coefficient position (k) in input coefficient block (i) for input coefficient blocks i=1 to m. The coefficients in the input coefficient blocks 10*a* . . . 10*n* may be in a zig-zag scan order in the positions for k=1 . . . p. After generating the n component output blocks 14*a* . . . 14*n*, control may proceed to block 162 to perform the operations at blocks 132-140 in FIG. 3.

The embodiment of FIG. 4 calculates the second type coefficients, e.g., AC coefficients, in component output block (j) directly from the coefficient position (k) values in the m input coefficient blocks 10*a* . . . 10*m* without generating intermediate output blocks 12*a* . . . . 12*mn*.

As discussed, the scaling factor tables 18*a* . . . 18*mn* provide a mapping of an output value in the output color space to a scaling factor to be applied to the AC coefficients in the input coefficient block i to produce an output coefficient block (i,j) for the color component i in the input color space and the color component j in the output color space. The mapping of output values in the output color space to scaling factors for each color component in the input (i) and output (j) color spaces may be determined from a function (i,j) for a curve fit to sample data comprising the scaling factors applied to AC coefficients to produce output values in the output color space.

Figure 5:
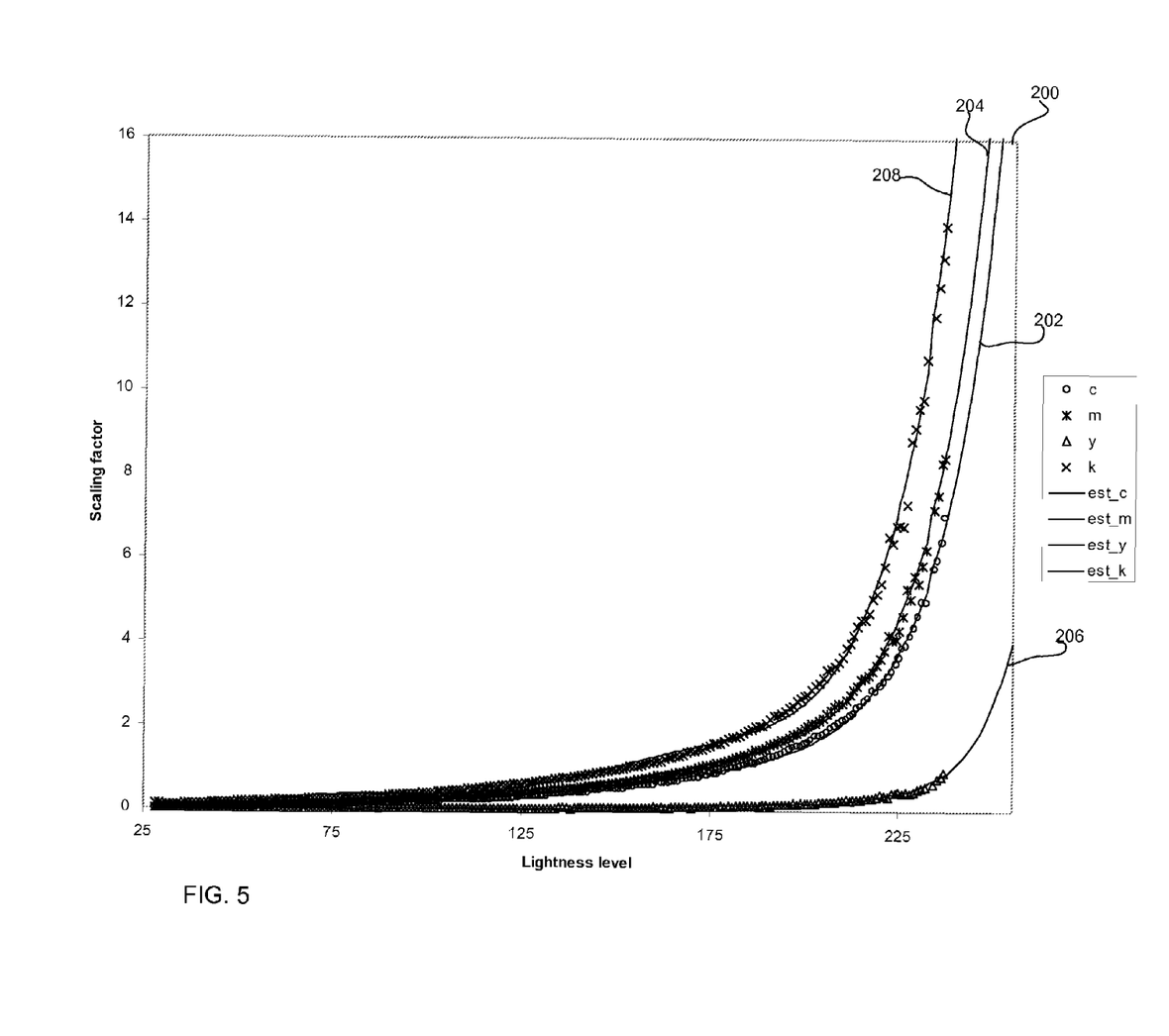
FIG. 5 illustrates curves for each of the CMYK color components fit to data comprising scaling factors for output values in a K color space for CMYK to K color conversion.

FIG. 5 illustrates data showing a graph 200 of scaling factors for each of a CMYK color components (on the Y axis) for different output values in a K output color space (on the X axis). For each CMYK input color component, a curve 202, 204, 206, and 208, respectively, is fit to the plotting of the scaling factors. The function representing the curve 202, 204, 206, and 208 may be used to determine a scaling factor for one of the CMYK color components for a given K color space output value. The functions representing these curves may then be used to generate scaling factor tables 18*a* . . . . 18*mn*, one for each of the input CMYK color components.

FIGS. 6, 7, 8, and 9 show example graphs of scaling factors for each of the input color components, in this example CIELAB, for output values in the CMYK output color space for the CMY and K output color components, respectively. Thus, there is one graph for each of the output color components CMYK, where each graph provides the functions or curves for each input color component (i) for the output color component (j). The fit curve for each input color component (i) for an output color component (j) may be used to determine the scaling factors (i,j) for different output values in the output color space that can be used to form scaling factor table (i,j).

Figure 6:
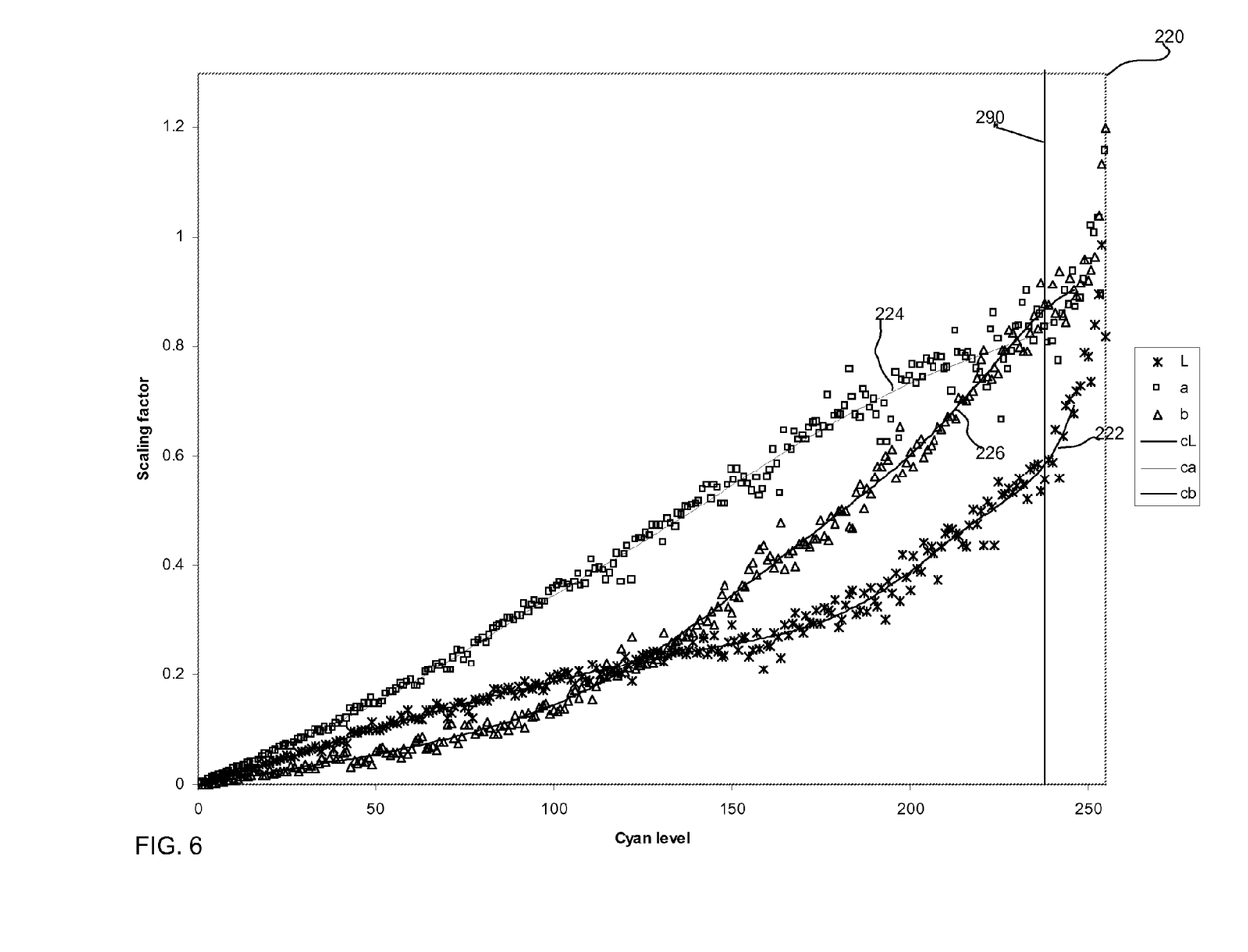
FIG. 6 illustrates curves for each of the Lab color components fit to data comprising scaling factors for output values in a CMYK color space for a cyan (C) color component for Lab to CMYK color conversion.

FIG. 6 illustrates data showing a graph 220 of scaling factors for each of a Lab input color components (on the Y axis) for different output values in a CMYK output color space (on the X axis) for the Cyan (C) color component. For each Lab input color components, a curve 222, 224, and 226, respectively, is fit to the plotting of the scaling factors for the input color component Lab. The function representing the curve 222, 224, and 226, may be used to determine a scaling factor for the input Lab color components for the Cyan (C) output component for a given output value in the CMYK color space. The functions, e.g., linear equations, representing these curves 222, 224, and 226 may then be used to generate scaling factor tables (i,j) one for each of the input Lab color components (i) for the Cyan (C) output color component (j).

Figure 7:
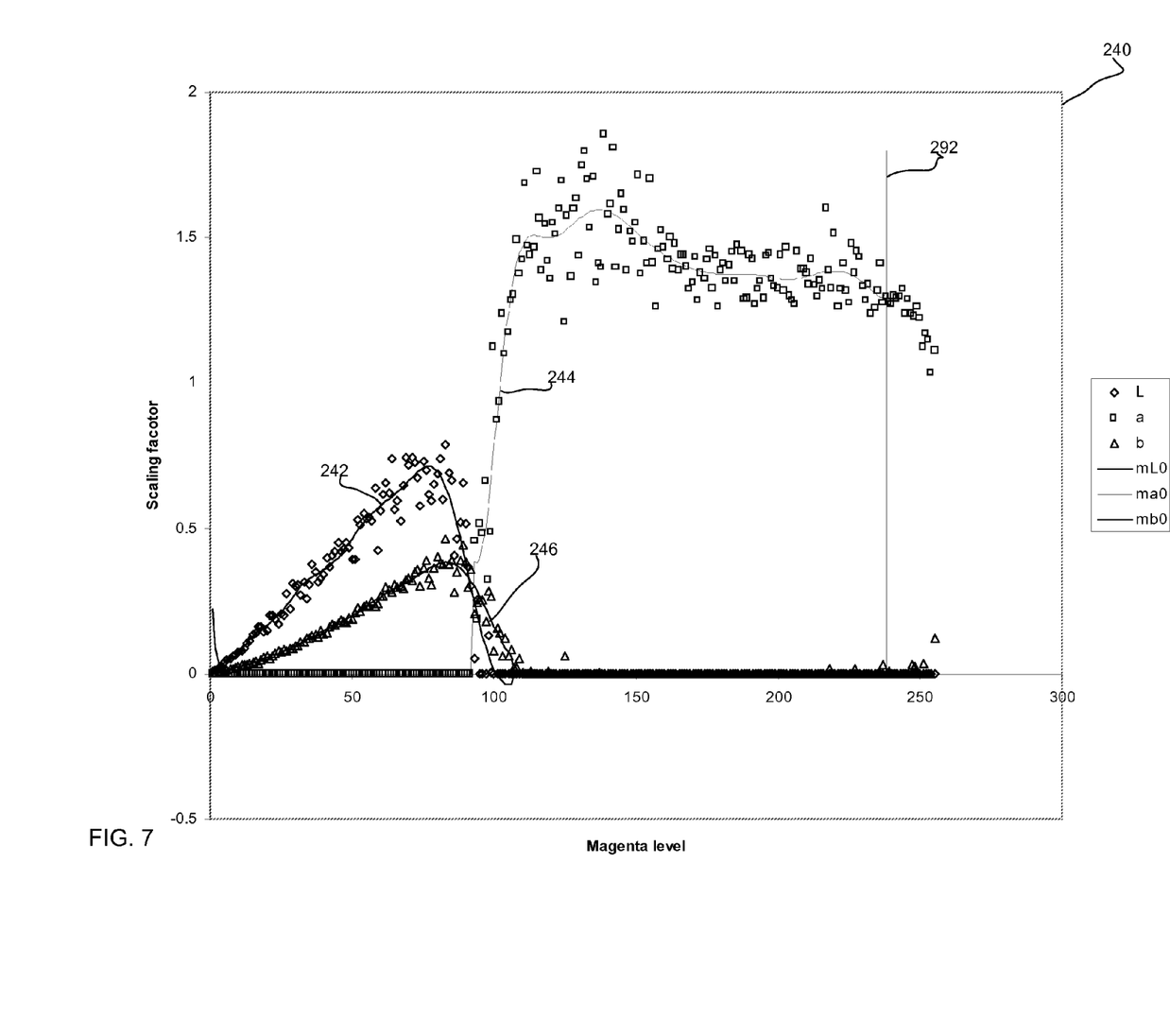
FIG. 7 illustrates curves for each of Lab color components fit to data comprising scaling factors for output values in a CMYK color space for a Magenta (M) color component for Lab to CMYK color conversion.

FIG. 7 illustrates data showing a graph 240 of scaling factors for each of a Lab input color components (on the Y axis) for different output values in a CMYK output color space (on the X axis) for the Magenta (M) color component. For each Lab input color components, a curve 242, 244, and 246, respectively, is fit to the plotting of the scaling factors for the input color component Lab. The function representing the curve 242, 244, and 246, may be used to determine a scaling factor for the input Lab color components for the Magenta (M) output component for a given output value in the CMYK color space. The functions, e.g., linear equations, representing these curves 242, 244, and 246 may then be used to generate scaling factor tables (i,j) one for each of the input Lab color components (i) for the Magenta (M) output color component (j).

Figure 8:
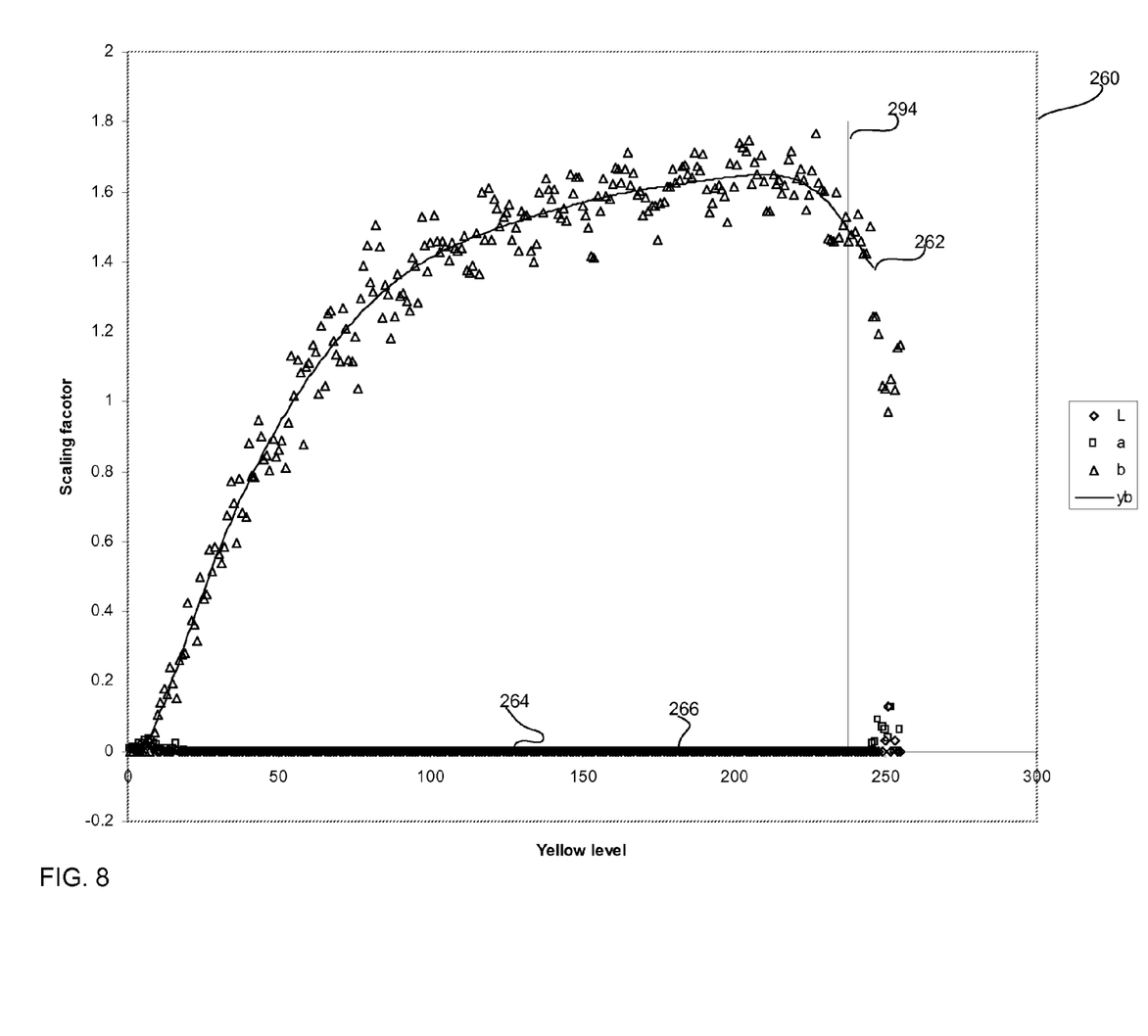
FIG. 8 illustrates curves for each of Lab color components fit to data comprising scaling factors for output values in a CMYK color space for a yellow (Y) color component for Lab to CMYK color conversion.

FIG. 8. illustrates data showing a graph 260 of scaling factors for each of a Lab input color components (on the Y axis) for different output values in a CMYK output color space (on the X axis) for the Yellow (Y) color component. For each Lab input color components, a curve 262, 264, and 266, respectively, is fit to the plotting of the scaling factors for the input color component Lab. The function representing the curve 262, 264, and 266, may be used to determine a scaling factor for the input Lab color components for the Yellow (Y) output component for a given output value in the CMYK color space. The functions, e.g., linear equations, representing these curves 262, 264, and 266 may then be used to generate scaling factor tables (i,j) one for each of the input Lab color components (i) for the Yellow (Y) output color component (j). The fit curves 264 and 266 for the a and b input color components are both close to providing scaling factor values of zero for most output values for the Y output color component.

Figure 9:
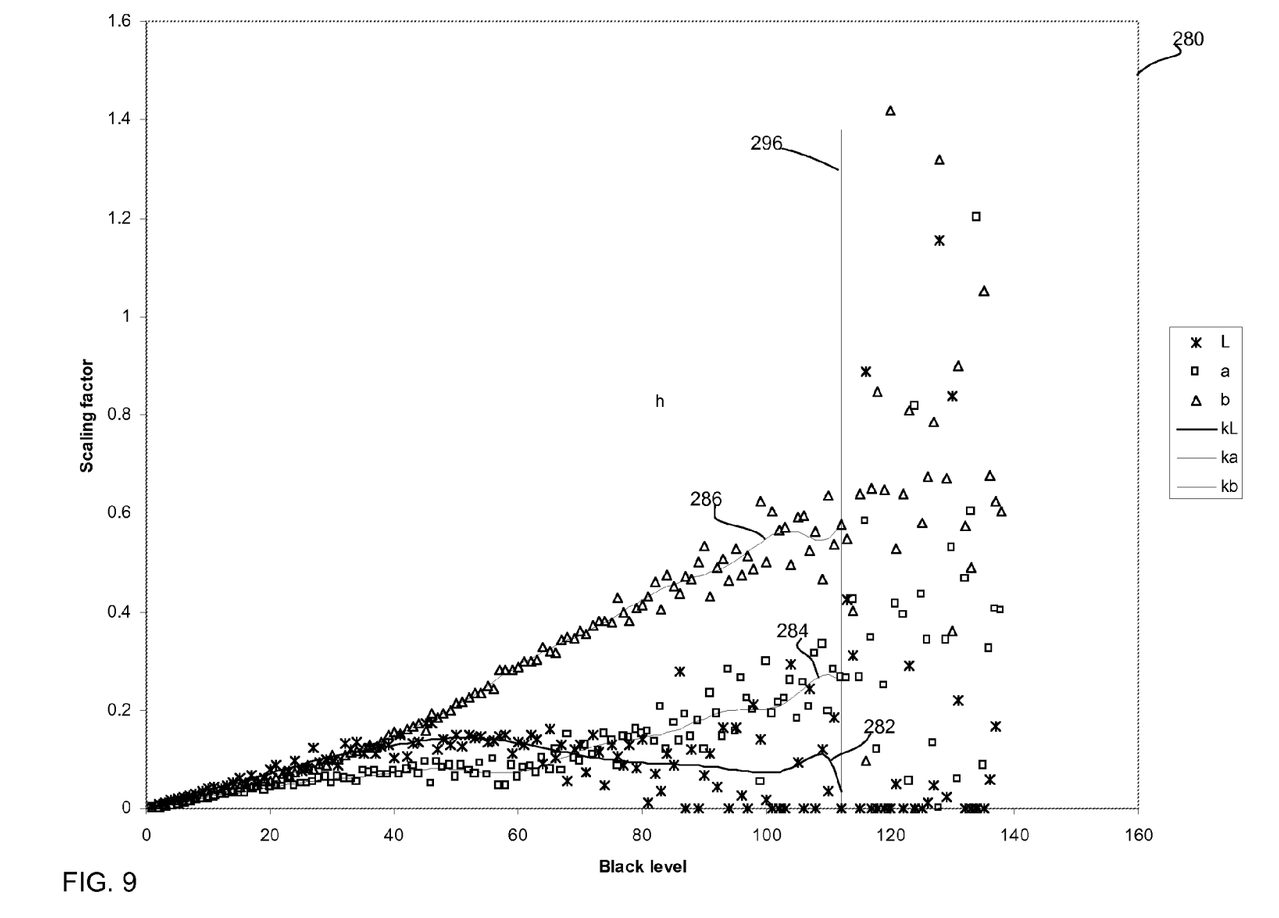
FIG. 9 illustrates curves for each of Lab color components fit to data comprising scaling factors for output values in a CMYK color space for a black (K) color component for Lab to CMYK color conversion.

FIG. 9. illustrates data showing a graph 280 of scaling factors for each of a Lab input color components (on the Y axis) for different output values in a CMYK output color space (on the X axis) for the Black (K) color component. For each Lab input color components, a curve 282, 284, and 286, respectively, is fit to the plotting of the scaling factors for the input color component Lab. The function representing the curve 282, 284, and 286, may be used to determine a scaling factor for the input Lab color components for the Black (K) output component for a given output value in the CMYK color space. The functions, e.g., linear equations, representing these curves 282, 284, and 286 may then be used to generate scaling factor tables (i,j) one for each of the input Lab color components (i) for the Black (K) output color component (j). The function or curve fit to the data is used to find the missing scaling factor at a certain output level and to smooth the noise in the data.

FIGS. 5-9 provided examples of overdetermined linear systems, which are systems having more equations than unknowns. In one embodiment, the over determined linear systems of FIGS. 5-9 may be solved using a least-square method. The model has the form of $Ax=d$ where A is a matrix, where there are more rows or equations than the unknowns in the x vector. Since there are no exact solutions, in one embodiment, x may be solved so that the residual vector $r=\|Ax-d\|_p$, where the norm of the residual (r) could be Lp-norm, where p is from 1 to infinity. There are many suitable algorithms known in the art to solve the least square equation, such as the QR factor, SVD, etc.

In one embodiment, the developer or user of the conversion system 2 may determine that certain output values require real domain processing if the functions (i,j) for the scaling factors (i,j) have unacceptable error levels. An error level may comprise the error in how the function (i,j) fits to the data or the curve of the function (i,j) changing at a certain unacceptable rate. For instance, FIGS. 6-9 show threshold lines 290, 292, 294, and 296 for output values for the different output color component CMYK where an unacceptable error level is noted. An unacceptable error level may be empirically determined by human observation or computer algorithmic calculations. The thresholds 290, 292, 294, and 296 occur where the fitting of the curves to the data reaches an unacceptable error level. Other thresholds may be determined based on the criteria used to determine an unacceptable error level.

In FIGS. 6-7, the decision to abort is illustrated with a single threshold and all output values in the CMYK color space above the single threshold are processed in the real domain. In an alternative embodiment, the decision to abort can be decided on an output value basis. In one embodiment, the scale factor tables 18a . . . . 18amn may include a special value or flag indicating that for a given output value, the real domain processing is to be used for the component output block. Further, in certain embodiments, the abort criteria may not be identical for all n output components. For example, three components (CMY) may have higher thresholds indicated as in FIGS. 6 to 8. The fourth component (K) shown in FIG. 9 may have a lower threshold as shown.

There may be one threshold (j) for each output color component (j) indicating one or more output values at which errors in each of the functions (i,j) for the output color component (j) are at an acceptable error level. In the described embodiments, the threshold (j) is satisfied for output values at which an error of the function (i,j) exceeds an acceptable error level. In cases where there is no unacceptable error level for the function (i,j) for output values, then the threshold (j) for such color component (j) may be unavailable or null. Further, a threshold (j) for a color component may specify a threshold output value, such that for output values greater than or less than the threshold output value the function is determined to produce scaling factors at an unacceptable error level. A threshold (j) may also comprise one or more ranges of output values, such that for output values within or outside the range, the function is deemed to produce scaling factors at an unacceptable error levels.

Figure 10:
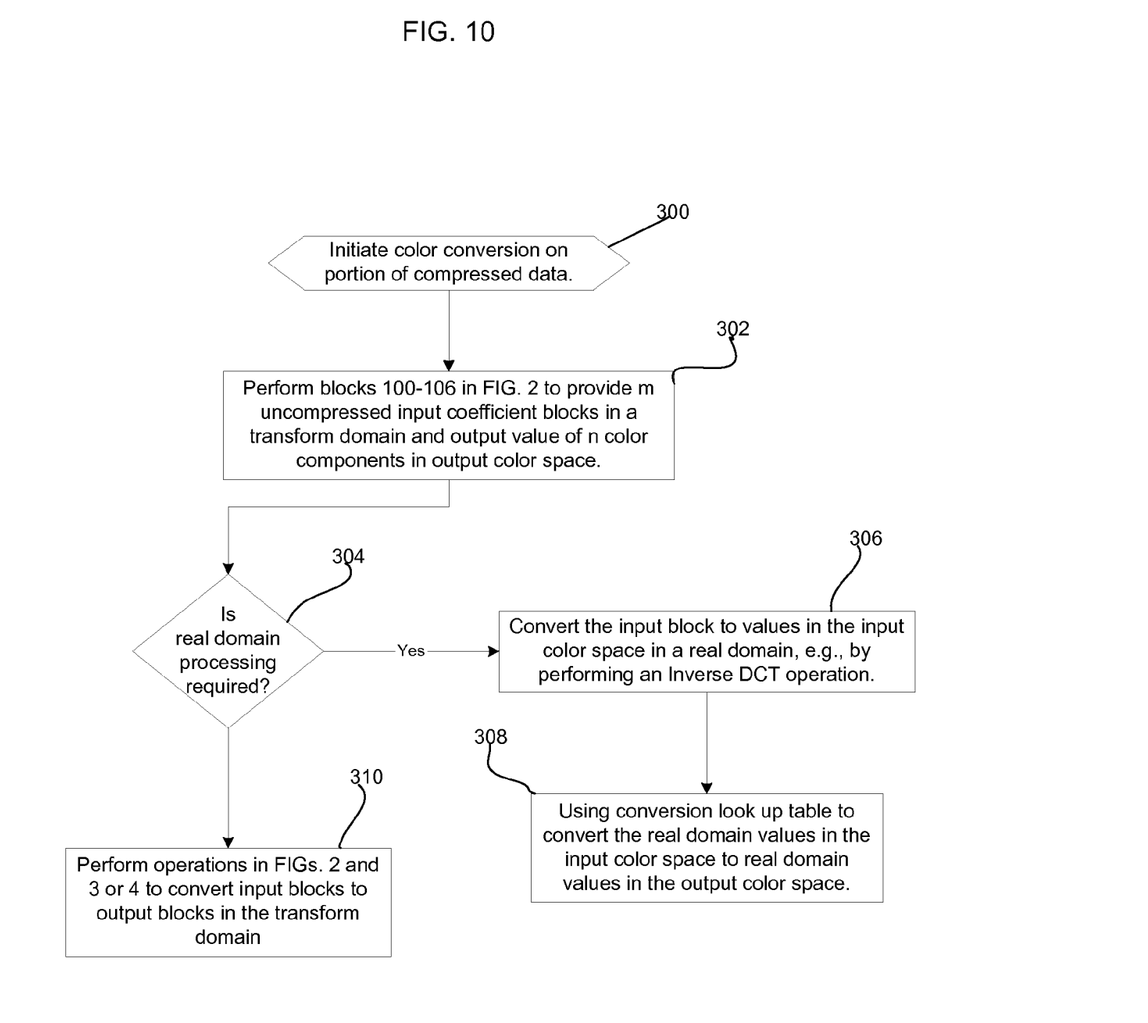
FIG. 10 illustrates an embodiment of operations to determine whether real domain processing is required to convert an input block to an output block in a different color space.

FIG. 10 illustrates an embodiment of operations performed by the conversion engine to determine whether the conversion should be performed in the transform domain, as disclosed in FIGS. 2-4, or should be performed in the real domain. Upon initiating the color conversion operation (at block 300), the conversion engine 6 performs (at block 302) the operations of blocks 100-106 in FIG. 2 to provide m uncompressed input coefficient blocks 10a . . . 10m in a transform domain and an output value of n color components in the output color space. A determination is made (at block 304) as to whether real domain processing is required. This determination may comprise determining whether the output value satisfies any available threshold (i,j) for any output color component (j), i.e., the output value is deemed within a range of output values for which the function (i,j) produces an unacceptable error level. If real domain processing is required, then the conversion engine 6 converts (at block 306) the input blocks 10a . . . 10m to values in the input color space in a real domain, e.g., by performing an Inverse DCT operation. The conversion look up table 16 is then used (at block 308) to convert the real domain values in the input color space to real domain values in the output color space. From this point, the output blocks in the real domain may be stored or converted back to the transform domain, e.g., by a DCT operation, and then compressed by quantization and entropy decoding.

If (at block 304) real domain processing is not required, e.g., the output value does not satisfy one of the thresholds (i,j), then conversion engine 6 performs the operations in the embodiments of FIGS. 3-4 or FIG. 5 to perform the color conversion in the transform domain.

In FIG. 5, for a range of output values near the origin, the curves are approximately flat. Also in FIG. 8, there a portions of the curve that are approximately flat and a function of only the "a" input component. For such regions where the scaling factor approximates zero, the dequantization step can be merged with the scale factor to produce directly the scaled AC coefficients. This can improve processing speed for such cases. The region that is considered flat will depend upon the printer accuracy and color faithfulness. In cases where the printer has to half tone the continuous tone color into just two outputs (on and off), less accurate results will not be noticeable.

Depending upon the accuracy/quality needed by the output device, different abort criteria may be developed. For example, a low resolution binary per component (on/off per color) printer that requires halftoning will not produce subtle differences. In such case, the abort may only be needed for high output values as seen in FIGS. 6-9. For high resolution continuous tone rendition on a high quality output display, the magenta region shown in FIG. 7 around output value 90 may also need real domain processing.

In a further embodiment, once the component output block 14a . . . 14n has been calculated, if the second type (e.g., AC) coefficient is exceptionally large in the component output block, then real domain processing may be required, which would involve redoing the calculation for the component output block (j) using real domain processing on the input blocks. To determine if the second type coefficient in the component output block is unacceptably large, a determination may be made of the largest possible divergence between the second type coefficient and first type of coefficient. Alternatively, the sum of the absolute values of the output second type coefficients may be considered. Yet further, the inverse of the coefficients may be determined and in the real domain, the largest excursion (difference) between values is calculated. In large smooth flat areas the second type of coefficients are small and approximations should be adequate."

Described embodiments provide techniques for color conversion from an input color space to an output color space, where the input color space has multiple color components and the output color space has one or more color components. In described embodiments, the conversion of the data in the input color space may be performed on the input color data in the transform domain to provide image data in the output color space in the transform domain. This technique allows color conversion to be performed without having to transform the input color data to the real domain before doing the conversion and then transforming the output color data in the real domain to the transform domain. Further, in described embodiments, a first coefficient type in the block of coefficients in the transform domain in the input color space is used to determine a scaling factor to apply to second type coefficients in the block to produce a block in the transform domain in the output color space.

In further embodiments, a decision may be made to perform the color conversion in the real domain. Real domain processing may occur for certain output values in the output color space where the function used to produce the scaling factors produces scaling factors at an unacceptable error level for the output value being considered. In this way, the transform domain conversion according to the operations of FIGS. 2-3 or 4 may be aborted in favor of a real domain conversion because the scaling factors that would be used for the transform domain may have an unacceptable error factor.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the first and second type coefficients in the blocks of image data in a transform domain comprised AC and DC coefficients. In alternative embodiments, the coefficients may comprise other types of coefficients to represent the image data in the transform domain. Further, the image data may be compressed and decompressed by compression algorithms other than JPEG.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the feature of a device may be alternatively embodied by one or more other devices which are not explicitly described as having such functionality/features. Thus, other embodiments of the present invention need not include the device itself.

The illustrated operations of FIGS. 2, 3, 4, and 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
   an integrated circuit including:
   a compression engine generating an input block of coefficients in an input color space, wherein the input block includes a first type coefficient and a plurality of second type coefficients; and
   a conversion engine operable to:
   convert the first type coefficient in the input block to an output value in an output color space;
   determine whether real domain processing is required; and
   convert the input block in a transform domain to an output block of coefficients in the transform domain in an output color space in response to determining that the output value does not require real domain processing.

2. The system of claim 1, wherein the conversion engine is further operable to:
   convert the input block to values in the input color space in a real domain in response to determining that real domain processing is required; and
   convert the real domain values in the input color space to real domain values in the output color space.

3. The system of claim 1, wherein converting the input block in the transform domain to an output block of coefficients in the transform domain in the output color space comprises:
   using the output value to determine a scaling factor for the second type coefficients
   applying the scaling factor to the second type coefficients to determine second type coefficients in the output color space; and
   forming the output block of coefficients in the output color space from the output value for the first type coefficient and the determined second type coefficients in the output color space.

4. The system of claim 3, wherein the scaling factors are determined from a function fit to data comprising the scaling factors used to produce output values in the output color space, and wherein determining whether real domain processing is required comprises determining whether the output value produces a scaling factor according to the function having an determined error level.

5. The system of claim 3, wherein there are scaling factors (i,j) for input color component (i) and output color component (j) determined from a function (i,j) fit to data comprising the scaling factors (i,j) used to produce output values in the output color space, and wherein determining whether real domain processing is required comprises determining whether the output value satisfies a threshold output value (i,j), and wherein the threshold output value indicates a range of output values producing scaling factors (i,j) according to the function (i,j) that have an determined error level.

6. The system of claim 5, wherein the functions (i,j) for certain input color components (i) and output color components (j) may not have a threshold output value (i,j) if there are no determined error levels for the function (i,j), wherein real domain processing is not required for functions (i,j) that do not have threshold output values.

7. The system of claim 3, wherein there are scaling factors (i,j) for input color component (i) and output color component (j) determined from a function (i,j) fit to data comprising the scaling factors (i,j) used to produce output values in the output color space, further comprising:
   a plurality of tables (i,j) providing scaling factors (i,j) for different output values, wherein the scaling factor (i,j) is set to a flag indicating real domain processing for output values producing scaling factors (i,j) according to the function (i,j) that have an determined error level, and wherein determining whether real domain processing is required comprises determining whether the scaling factor (i,j) for an output value in one of the tables (i,j) is set to the flag indicating real domain processing.

8. The system of claim 1, wherein the second type coefficients in the output block are used to determine whether real domain processing of the input block is required.

9. An article of manufacture comprising a tangible computer readable medium including data that, when accessed by a processor, cause the processor to perform operations comprising:
   generating an input block of coefficients in an input color space, wherein the input block includes a first type coefficient and a plurality of second type coefficients;
   converting the first type coefficient in the input block to an output value in an output color space;
   determining whether real domain processing is required;
   converting the input block in a transform domain to an output block of coefficients in the transform domain in an output color space in response to determining that the output value does not require real domain processing.

10. The article of manufacture of claim 9, further comprising:
    converting the input block to values in the input color space in a real domain in response to determining that real domain processing is required; and
    converting the real domain values in the input color space to real domain values in the output color space.

11. The article of manufacture of claim 9, wherein converting the input block in the transform domain to an output block of coefficients in the transform domain in the output color space comprises:
    using the output value to determine a scaling factor for the second type coefficients;
    applying the scaling factor to the second type coefficients to determine second type coefficients in the output color space; and
    forming the output block of coefficients in the output color space from the output value for the first type coefficient and the determined second type coefficients in the output color space.

12. The article of manufacture of claim 11, wherein the scaling factors are determined from a function fit to data comprising the scaling factors used to produce output values in the output color space, and wherein determining whether real domain processing is required comprises determining whether the output value produces a scaling factor according to the function having an determined error level.

13. The article of manufacture of claim 11, wherein there are scaling factors (i,j) for input color component (i) and output color component (j) determined from a function (i,j) fit to data comprising the scaling factors (i,j) used to produce output values in the output color space, and wherein determining whether real domain processing is required comprises determining whether the output value satisfies a threshold output value (i,j), wherein the threshold output value indicates a range of output values producing scaling factors (i,j) according to the function (i,j) that have an determined error level.

14. The article of manufacture of claim 13, wherein the functions (i,j) for certain input color components (i) and output color components (j) may not have a threshold output value (i,j) if there are no determined error levels for the function (i,j), wherein real domain processing is not required for functions (i,j) that do not have threshold output values.

15. The article of manufacture of claim 11, wherein there are scaling factors (i,j) for input color component (i) and output color component (j) determined from a function (i,j) fit to data comprising the scaling factors (i,j) used to produce output values in the output color space, further comprising:
   a plurality of tables (i,j) providing scaling factors (i,j) for different output values, wherein the scaling factor (i,j) is set to a flag indicating real domain processing for output values producing scaling factors (i,j) according to the function (i,j) that have an determined error level, and wherein determining whether real domain processing is required comprises determining whether the scaling factor (i,j) for an output value in one of the tables (i,j) is set to the flag indicating real domain processing.

16. The article of manufacture of claim 9, wherein the second type coefficients in the output block are used to determine whether real domain processing of the input block is required.

* * * * *